United States Patent

[11] 3,537,550

| [72] | Inventor | Robert G. Ely<br>8321 Sanders Court, Fresno, California 93702 |
|---|---|---|
| [21] | Appl. No. | 806,745 |
| [22] | Filed | March 12, 1969 |
| [45] | Patented | Nov. 3, 1970 |

[54] STOP FOR RECIPROCABLY COUPLED MEMBERS
10 Claims, 8 Drawing Figs.

[52] U.S. Cl. .................................................. 188/110,
188/1, 212/39, 212/69
[51] Int. Cl. .................................................. B60t 7/12
[50] Field of Search .......................................... 212/39,
66–69, 132; 188/1, 110; 74/(Consulted)

[56] References Cited
UNITED STATES PATENTS

| 2,828,833 | 4/1958 | Civecco | 188/110 |
| 3,433,367 | 3/1969 | Novotny | 212/39 |

Primary Examiner—Harvey C. Hornsby
Attorney—Huebner & Worrel

ABSTRACT: A stop for reciprocably coupled members, particularly suited for use in a braking device for rotary structures including cranes and the like mounted for rotation on stationary base structure, being particularly characterized by an hydraulic-pneumatic shock absorber operatively coupled with a ring-like support fixed in circumscribing relationship to the base and having spaced, bifurcated stop members mounted thereon and interconnected with the shock absorber through a flexible cable including a protuberance fixed near one end thereof adapted alternately to be received within the spaced stop members as the rotary structure is reciprocated relative to the base structure, whereby the protuberance alternately serves to engage the stop members and causes the cable to apply energy-dissipating force to the shock absorber for achieving a gradual braking, at preselected rates, for arresting the displacement of the rotary structure.

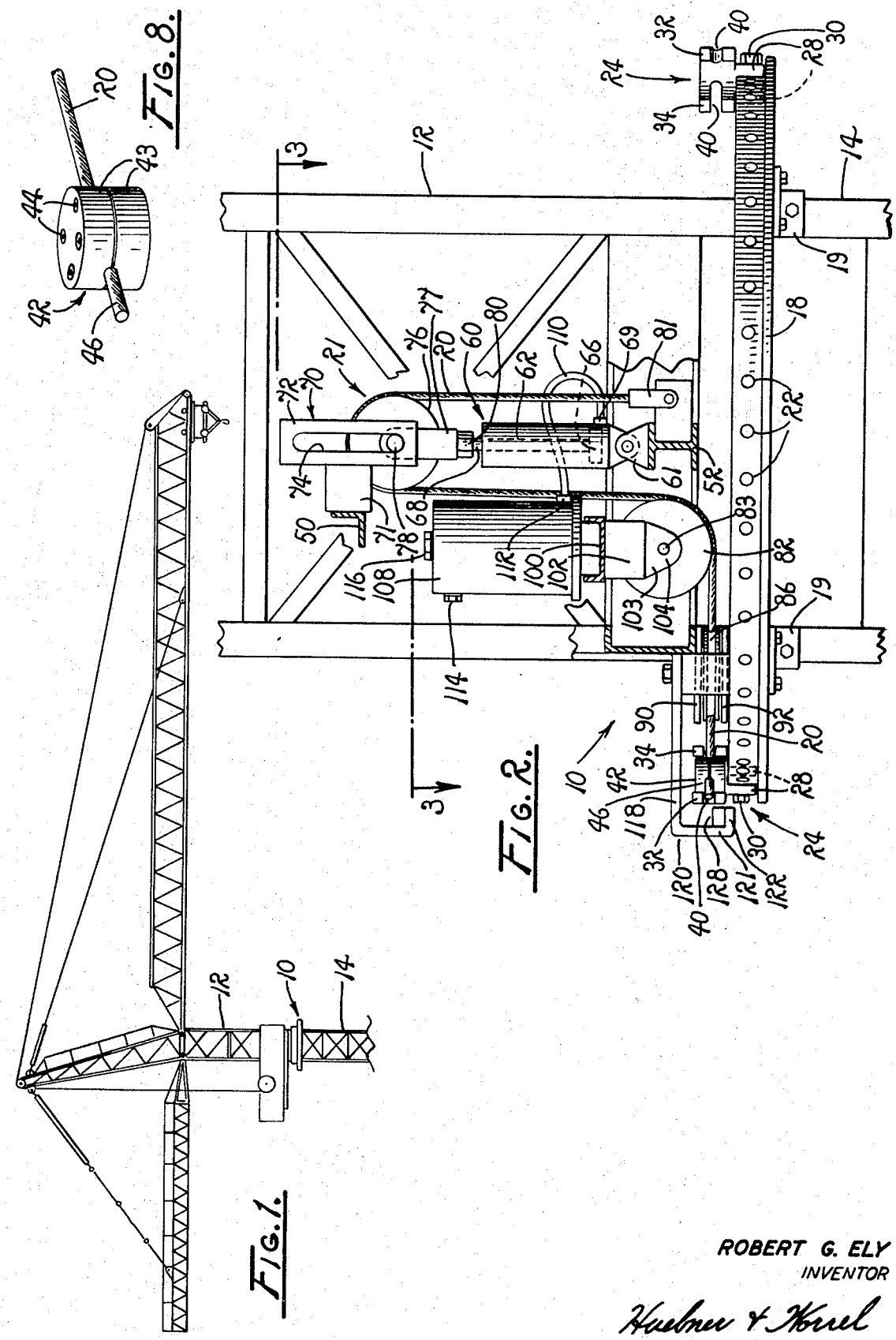

Patented Nov. 3, 1970
3,537,550
Sheet 2 of 2
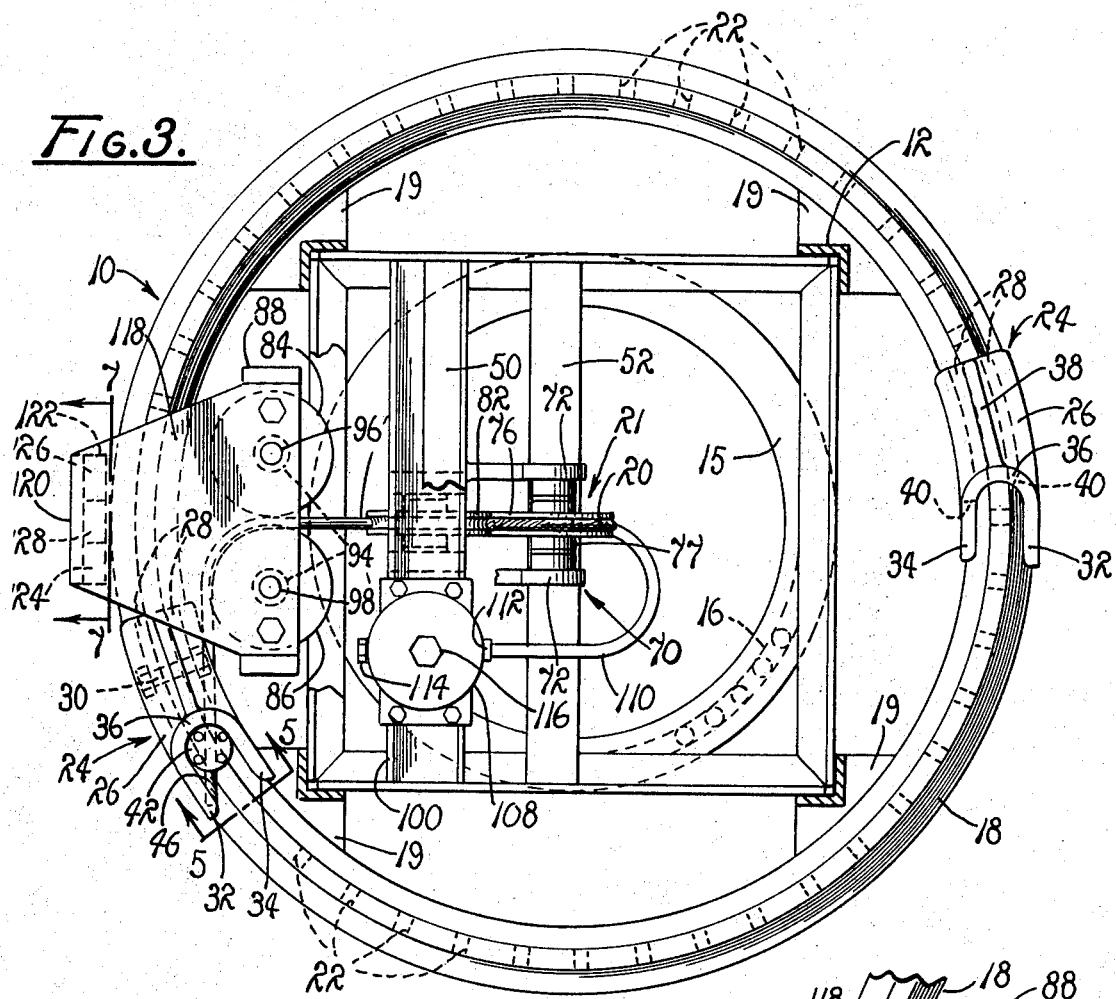
ROBERT G. ELY
INVENTOR
Huebner & Worrel
ATTORNEYS 3,537,550

STOP FOR RECIPROCABLY COUPLED MEMBERS

BACKGROUND OF THE INVENTION

This invention generally relates to a stop for reciprocably coupled members, and more specifically to a stop for reciprocably coupled, rotatable structures such as cranes, and the like, which employ extended booms operatively adapted to describe arcs of 360° or less.

The prior art includes numerous devices for achieving braking functions for reciprocating structural members. Many of these devices have been provided for arresting displacement of rotatable structures such as cranes and the like, which employ a fixed base and a horizontally extended boom, as well as those of the type which employ an inclined boom mounted on a fixed base supported within conventional vehicles, such as, for example, flatbed trucks.

A common characteristic for the various types of rotating cranes is that each type employs an extended boom having the mass of the article being transported suspended from the extended end of the boom as it is rotatably displaced to describe a horizontal arc extending between the points of pick up and discharge.

As will be fully appreciated by those familiar with rotating cranes, once a boom, with its supporting structure, is set in motion in a horizontal direction, the rotating portion of the structure has imparted thereto significant quantities of kinetic energy, which energy must be dissipated in order to arrest the motion of the rotating structure. Frequently, booms operatively are employed in "tight spaces" wherein the extent of the boom's horizontal displacement must be limited, and error in overtravel is extremely critical. Normally, these conditions prevail where a boom is being employed in the erection of structures in populated and industrialized areas, since in these areas a crane must be employed without striking existing buildings, power lines, and similar structures.

Where braking is achieved by positively coupling the rotating portion of the crane to a fixed base, the resulting torque often is applied in a manner such as to disable the braking device or to do substantial damage to the base and thus tends to impose a requirement of constant and frequent repairs.

SUMMARY OF THE INVENTION

This invention overcomes many of the aforementioned difficulties through the use of a simplified and economic stop mechanism which employs a readily available hydraulic-pneumatic shock absorber mounted upon one of a pair of mated and relatively displaceable structural members, and a fixed, positive stop, mounted on the other structural member of the pair, interconnected through a tension cable, which cable is arrested by the positive stop and acts against the shock absorber for "snubbing" or dissipating the kinetic energy of the rotating structure at a predetermined rate, to provide a braking effect for thus preventing overtravel of the rotating structure.

Accordingly, an object of the instant invention is to provide a simplified and improved stop mechanism for reciprocating structures.

Another object is to provide an improved stop including an hydraulic actuator and particularly adapted for use with cranes of the type including a mass supporting boom extending from a rotary structure.

Another object is to provide a simplified, economic and highly effective hydraulic-pneumatic stop device for facilitating determinable rates of deceleration and ultimate braking of reciprocably coupled rotatable structural members.

Another object of the instant invention is to provide an effective stop for reciprocably coupled, crane-like structures of the type including first and second structural members operatively interconnected for accommodating reciprocating rotational displacement therebetween.

Another object is to provide an efficient and improved hydraulic-pneumatic braking device adapted for use with cranes of the type including a fixed base member, an extended boom, a driven rotatable structural member rotatably mounted on the base member and supporting the boom, and an hydraulic-pneumatic shock absorber operatively coupled with the members and adapted effectively to dissipate rotational kinetic energy at determinable rates for achieving a "snubbing" and an ultimate braking for the members as they are caused to rotate with respect to each other.

BRIEF DESCRIPTION OF THE DRAWINGS

FIG. 1 is a partial elevation of a tower crane illustrating an operative environment of a stop mechanism embodying the principles of the instant invention.

FIG. 2 is a partially sectioned elevational view, on an enlarged scale, of the stop mechanism illustrated in FIG. 1.

FIG. 3 is a plan view of the stop mechanism taken along line 3–3 of FIG. 2.

FIG. 4 is a fragmentary elevational view of a bifurcated stop member employed by the stop mechanism of FIGS. 1 through 3.

FIG. 5 is a partially sectioned end view of a bifurcated stop member, taken on line 5–5 in FIG. 4.

FIG. 6 is a fragmentary plan view of the cable, its block, and associated sheaves and transport mechanism illustrated in FIG. 3, but rotated counterclockwise relative to its position as illustrated in FIG. 3.

FIG. 7 is a partially sectioned elevation of the transport mechanism taken along lines 7–7 in FIG. 6.

FIG. 8 is a perspective view of a cable block employed by the embodiment of the instant invention.

BRIEF DESCRIPTION OF THE PREFERRED EMBODIMENT

Referring to FIG. 1, there is illustrated a tower crane employing a stop 10 embodying the principles of the present invention. The stop 10 is illustrated as being disposed between mutually rotatable structural members 12 and 14 of a tower crane. However, it should be understood that the stop 10 is intended to be employed in various environments such as, for example, in cranes of the type normally mounted on flatbed vehicles. Furthermore, the stop of the instant invention may be employed in environments wherein it is desirable to provide means for effectively dissipating the kinetic energy of reciprocable structural components having general utility, including members having linear reciprocating displacement characteristics.

However, as shown, the stop 10 is coupled between the rotating structure 12 of the tower crane and the supporting base structure 14. The structure 12 is reciprocally rotated relative to the base 14, by any convenient drive mechanism, not shown, for swinging the boom thereof in opposing horizontal directions, while the base structure 14 is secured against rotation. As the drive mechanism employed for driving the crane forms no part of the instant invention and such mechanisms are well known, a description thereof is omitted.

The rotating structure 12, as better illustrated in FIG. 2, is seated and supported for rotation by the uppermost end portion of the base structure 14. While not shown, it is to be understood that a convenient mechanical interconnection is employed between the structures 12 and 14. Such interconnecting structure is of a convenient design. Since the mechanical interconnection forms no specific part of the instant invention, a detailed description thereof is omitted in the interest of brevity. However, it is to be understood that the base structure serves as a supporting base for the rotating structure, and includes convenient means, such as, for example, a bearing support plate 15 and a race of roller bearings 16, FIG. 3, for supporting the rotating structure in a manner such that the rotating structure may be rotatably reciprocated with respect to the base.

Circumscribing the uppermost or supporting end of the base structure 14 there is fixed a ring or annular support 18. The support 18 includes an inverted T-shaped cross-sectional configuration, and is fixedly secured to the base structure through suitable brackets 19. A tension cable 20 is secured to the rotating structure through a shock absorber 21 mounted to rotate with the rotating structure, and operatively serves to couple the rotatable structure with the ring 18 and, therefore, serves to couple the rotating structure to the fixed base for operatively arresting rotation of the rotating structure.

About the ring 18 there is provided a plurality of horizontal openings 22 which extend through the vertical body portion of the ring. As better illustrated in FIGS. 4 and 5, the body portion of the ring 18 receives thereon a pair of spaced bifurcated stop members 24. Each of the stop members includes a saddle-plate 26 and a pair of spaced legs 28 depending from the plate 26.

The legs 28 are disposed at opposite sides of the body portion of the ring 18 and include therein coaxially aligned openings through which there are extended horizontally disposed, elongated, screw-threaded pins 30. While the pins 30 are illustrated as being of a screw-threaded type, whereby suitable nuts 31 may conveniently be secured thereto as the pins are inserted into the openings 22, it is intended that the pins be of any convenient design, so long as they are adapted to secure the stop members 24 in place on the ring 18. In practice, it is intended that each of the stop members 24 be positioned at a selected point along the circumference of the ring 18 so that the stops may be rendered effective for engaging and thus anchoring the cable 20 at determinable points for achieving a selected braking function at an appropriate point in the rotational advancement of the structure 12.

Each stop member 24 also includes opposing side plates 32 and 34 joined through a U-shaped base portion 36. A supporting gusset 38 is secured to the base 36 for supporting the base 36 in a horizontal direction. It is to be particularly noted that each of the side plates 32 and 34 is slotted by means defining an elongated horizontal slot 40, whereby the cable 20 may simultaneously be extended therethrough.

The cable 20 has mounted thereon a suitable protuberance adapted to be seated between the plates 32 and 34 of the stop members 24, when the cable is caused to extend through the slots 40. The protuberance is in the form of a cable block 42 fabricated in a convenient manner which permits the block 42 to receive therein the cable 20 to be fixedly secured thereto. While not illustrated, the cable 20 normally includes a bead-like collar or stop member fixedly secured thereto, by any suitable means, such as, for example, swaging or the like, so that the block 42 may be mounted thereon and secured thereto.

As illustrated, the block 42 includes mated and opposed members 43 secured together by screws 44, for example, with the bead-like stop being seated within suitable depressions conveniently formed within the block 42 between the mated surfaces of the opposing members 43. Normally, a short length of cable or pigtail 46 is extended from the block. While the block may be of a disc-shaped configuration, as illustrated, it should be apparent that if desired, the block 42 may be of any suitable configuration, including a spherical configuration, wherein the opposing members thereof are formed as hemispheres secured together with the bead-like support being disposed therewithin and the pigtail being extended therefrom. Where the block 42 assumes a spherical configuration, the bifurcated stop member 24, of course, is of a suitable configuration for receiving therein a spherical stop.

The shock absorber 21 is supportingly mounted on a pair of vertically spaced support beams 50 and 52. The opposite ends of the beams 50 and 52 are welded or otherwise conveniently secured to the rotating structure 12 so as to rotate therewith as the rotating structure is drivingly rotated relative to the base structure 14.

The shock absorber 21 includes a vertically oriented, single-acting hydraulic actuator 60 secured to the beam 52 by means of a clevis and pin coupling 61 secured to the beam by any convenient means. The actuator 60 includes a cylindrical barrel 62 within which there operatively is seated a concentrically arranged piston having an operative piston head 66 from which is extended an elongated shaft 68. The head 66 includes a suitable O-ring seal and defines within the barrel 62 a fluid-tight chamber or cavity, not designated, within which hydraulic fluid is entrapped for applying pressure to the head 66. A port 69 is extended through the wall of the barrel and communicates with the fluid-tight chamber and functions as a passageway for hydraulic fluid as the fluid is introduced into and discharged from the chamber of the barrel. Hence, the port in effect functions as a restrictor for the fluid as the piston shaft 68 operatively is reciprocated within the barrel.

Secured to the rail 50, by brackets 71, there is a coupling 70 which includes a pair of parallel, vertically extended plates 72 having formed therein aligned and congruent guide slots 74. The plates 72 are so spaced that the shaft 68 readily may be reciprocated therebetween, while it serves to support thereon a cable sheave 76 which operatively receives the cable 20 about the periphery thereof. The sheave 76 is rotatably received between the opposite arms of a yoke 77 fixed to the end of the shaft 68. A horizontally extended bearing pin 78, the ends of which are seated within the guide slots 74, serves to couple the sheave 76 and yoke 77 to the coupling 70. The yoke 77, in turn, is fixedly secured to the end of the shaft 68 by any suitable means, including a screw-threaded jam-nut 80 of convenient design.

Therefore, it will be appreciated that as the shaft 68 of the actuator 60 is caused to reciprocate, relative to the barrel 62, the yoke 77 and sheave 76, mounted on the pin 78, are displaced therewith, and that the pin 78 is guided along the surfaces of the guide slots 74 so that displacement of the sheave 76 is limited to vertical directions.

The cable 20 is fixed at one end, opposite the block 42, to the beam 52, adjacent the lowermost end of the actuator 60, by a convenient clevis and pin connector 81, which is suitably secured to the end of the cable so that the associated end of the cable is securely fixed relative to the rotating structure 12 and the shock absorber 21.

Since it is intended that the shock absorber 21 dissipate the kinetic energy operatively imparted to the rotating structure 12, the hydraulic fluid contained within the sealed chamber of the barrel 62 is forcibly displaced from the barrel 62 through the port 69 as the piston shaft 68 is forcibly retracted as tension is applied to the cable 20. To achieve this retraction of the shaft, the run of the cable 20 is reversed as it passes about the sheave 76 so that the cable is caused to extend in a parallel relationship with the shaft, and at the opposite sides thereof. After passing the sheave 76, the cable 20 is turned and directed in a horizontal direction by means including a second rotatably supported sheave 82. The sheave 82 is laterally spaced from the lowermost end of the actuator 60 and mounted to rotate about a horizontal bearing pin 83. This sheave serves to direct the cable 20 outwardly from the shock absorber 21 to a point where it is engaged by a pair of mated guide sheaves 84 and 86. These sheaves are mounted in a side-by-side relationship and rotate in a plane common to the lower periphery of the sheave 82 about vertical axes with the cable 20 being disposed and operatively secured therebetween. These sheaves serve for controlling and assisting in the horizontal displacement of the cable.

The sheaves 84 and 86 are mounted by a convenient bracket 88 suitably secured to the structure 12. This bracket includes a pair of spaced parallel plates 90 and 92 between which are arranged the sheaves 84 and 86. The plates 90 and 92 include coaxially aligned openings into which are inserted journal bearings 94 for receiving therein vertical bearing pins 96 and 98 for rotatably supporting the sheaves 84 and 86.

Therefore, it will be appreciated that as the cable 20 is extended from the opening formed between the sheaves 84 and 86, it is directed in a horizontal direction, however, it also is directed in opposing lateral directions, within the plane common to the plane of the peripheral surface of the sheave 82, depending upon the direction of rotation of the rotating structure 12. Hence, the cable 20 may be tensioned to apply downwardly directed force to the sheave 76, through an engagement of the block 42 with either of the spaced bifurcated stop members 24, since it is turned by either of the sheaves 84 or 86, depending upon the relative direction of rotation of the structure.

Adjacent to and above the sheave 82 there is a transversely extended support beam 100. This beam supports the sheave 82 through a suitable yoke 102 including depending brackets 103. The brackets 103 are provided with journal bearings 104 through which is extended the pin 83. The rail 100 further serves as a convenient mount for supporting an hydraulic-pneumatic accumulator 108 adjacent the actuator 60.

The accumulator 108, as presently employed, includes an oil-filled chamber, not designated, separated from a convenient gas-charged or pressurized chamber by a resilient diaphragm, also not designated. Since the particular type of accumulator employed is a matter of preference, a detailed description thereof is omitted in the interest of brevity. However, it is to be understood that the accumulator 108 is of a convenient design which permits the accumulator to receive therein fluid dispelled under pressure from the adjacent actuator 60 and to redeliver the fluid to the actuator as fluid pressure therewithin is reduced in response to a detensioning of the cable 20, as the cable block 42 is disengaged from an associated stop member 24.

In order to achieve the desired exchange of fluid between the accumulator 108 and the actuator 60, a flexible conduit 110, having convenient fittings provided therefor, is connected between the port 69 of the barrel 62, and the accumulator 108, through a suitable port 112 provided near one end thereof. In practice, the accumulator 108 further includes fittings 114 and 116. The fitting 114 serves as an hydraulic fluid "filler" fitting for the accumulator, whereby hydraulic fluid can be introduced therein, while the fitting 116 is a fitting for accommodating a pneumatic "charging" of the accumulator through the introduction of gas under pressure.

The cable 20 normally is a relatively rigid cable capable of supporting the weight of the block 42 above and in a spaced relationship with the support ring 18. Rotation of the rotating structure 12 thus causes the block 42 to be transported and alternately engaged by the bifurcated stop members 24.

While the cable 20 normally is sufficiently rigid for maintaining the block 42 above the uppermost surface of the support ring 18, it may be found practical to provide transport means for lifting and transporting the block 42 between the spaced bifurcated stop members 24 to preclude the block from contacting the ring 18 as it is displaced relative thereto. To this end a laterally extended arm 118 is secured to the plate 90 of the bracket 88. As a practical matter, the arm 118 and the plate 90 may be formed as a unitary member. The arm 118 radially extends from above the sheaves 84 and 86 and terminates at a point beyond the periphery of the support ring 18 and includes a depending pigtail engaging carrier 120 having a horizontally directed U-shaped lift 121, FIG. 2, with its opening being extended toward the pigtail 46.

Supported by the lift 121, there is a block extractor 122 which serves to engage and lift the pigtail 46, as it extends from the block 42, and then to transport the block 42 from one of the bifurcated stop members 24 to the opposing stop member. To achieve this, the extractor 122 includes a pair of diametrically opposed, inclined camming surfaces 124 and 126 having a horizontally extended, plateaued transport surface 128 arranged therebetween. The surfaces 124 and 126 are so inclined that they engage the lowermost surface of the pigtail 46, as the rotating structure 12 is rotated, for causing the pigtail to be advanced therealong until it seats on the surface 128, whereupon the block 42 is supported by the extractor as the block is transported to and arrestingly engaged by the opposing bifurcated stop member 24, whereupon the pigtail is removed from the surface 128 of the extractor as the structure 12 continues to rotate. With this arrangement of structural components, the block 42 may be transported between the stops 24 in a manner such that damage resulting from engagement with the ring 18 effectively is precluded during the periods of transport between the stop members 24.

OPERATION

The operation of the described embodiment of the subject invention is believed to be readily apparent and is briefly summarized at this point.

The herein described stop for reciprocally coupled members, as illustrated, is mounted at the juncture of mated and mutually rotating structural members of a reciprocally rotatable crane. As presently employed, the crane includes the fixed base 14, secured against horizontal rotation, while the boom supporting rotating structure 12 is mounted to be drivingly rotated in horizontal directions by any convenient means, including a bull-gear, and serves for lifting and transporting masses of various types between selected points located along an arcuate path.

Mounted for rotation with the structure 12 is the shock absorber 21 including the hydraulic actuator 60, the accumulator 108 and the cooperating sheaves 76, 82, 84, and 86 through which extends the cable 20. The cable 20 is at its first end secured to the rail 52, through the clevis 81, while its extended end operatively supports the block 42. Hence, in operation the cable 20 and its associated cable block 42 are reciprocatingly transported through the rotation of the rotating structure 12. The support ring 18 fixedly supports the opposing bifurcated stop members 24 at preselected locations within the path of the block 42 as the rotating structure 12 is rotated.

Assuming that the block 42 is seated in one of the stop members 24 with the cable 20 extending through the slots 40 thereof, rotation imparted to the structure 12 causes the arm 118 to be arcuately displaced toward the adjacent stop member 24. As the arm 118 approaches the stop member, the fluid contained by the gas-charged accumulator 108 is forced therefrom through the force applied by pressurized gas of the gas charge, for thus forcing fluid into the fluid-tight cavity of the actuator 60. As the fluid enters the cavity, the shaft 68 is extended from the barrel 62 of the actuator 60, whereupon the sheave 76 is elevated and the pin 78 is guided in a vertical direction by the surface of the slots 74 of the parallel plates 72. As the sheave 76 is elevated, the end of the cable bearing the block 42 is retracted toward the sheaves 84 and 86. However, once the sheaves 84 and 86 are positioned adjacent the slot 40 of the stop member 24, displacement of the pin 78 is arrested as the ends of the pin are seated in the uppermost ends of the slots 74. The block 42 is pivoted within the stop 24 in a manner that the pigtail 46 is extended through the slot 40 of the side portion 32 of the stop member 24. With the pigtail thus disposed, the arm 118 has been permitted to advance the extractor 122 causing the lifting surface 124, or 126, depending upon the direction of arcuate rotation, to engage the pigtail 46 and thus cam the pigtail upwardly so that it is caused to be seated on the surface 128.

With the pigtail thus supported by the surface 128, continued rotation of the arm 118 and extractor 122 extracts the block 42 from the stop member 24 and transports it to and seats it in the adjacent stop member 24. As the block 42 is seated, it is caused to engage the base 36 of the stop member 24 thus to arrest and anchor the cable against further displacement. The cable 20 now is extended through the slot 40 of the stop member as displacement of the block 42 is arrested and the block is supported against further displacement. This results in a tensioning of the cable 20 as the rotating structure 12 continues to rotate under the influence of the kinetic energy imparted thereto. However, as the forces of tension increase, as a direct result of the seating of the block 42 in the stop member 24, the shaft 68 of the actuator 60 is forced downwardly into the barrel 62 against the fluid contained therewithin for increasing existing fluid pressures and for displacing the fluid through the restrictor or port 69 and into the accumulator 108, against the pressure of gas charge of the compressed gas contained therewithin. This displacement tends to dissipate the kinetic energy imparted to the rotating structure 12.

As can readily be appreciated, the rate of energy thus dissipated is accelerated as the gas within the accumulator is compressed under the forces applied thereto by the fluid being dispelled from the actuator 60. At a point, determined by the charge of the accumulator and the size of the orifice 69, the pressure within the accumulator is sufficient to overcome the force applied to the cable 20 thus to preclude further downward displacement of the sheave 76, as it is caused to act through the shaft 68 against the fluid of the actuator 60. At this point, the kinetic energy of the rotating structure is dissipated and rotation of the crane's rotating structure 12 is completely arrested. Since the stops 24 are positioned at selected points along the ring 18, the point at which rotation of the structure 12 is inhibited may be readily adjusted simply by repositioning the stops 24.

It is to be understood that when the crane is displaced in an opposite direction, the accumulator again acts to retract the extended cable 20, relative to the ring 18, and the arm 118 and the extractor 122 serve to engage and transport the block 42 to the opposite stop member 24, whereupon the block 42 again is seated, the cable 20 again is tensioned and fluid within the accumulator 108 again is pressurized for absorbing the kinetic energy of the rotating structure 12 so that rotation thereof gradually and positively is arrested in a "snubbing" mode.

In view of the foregoing, it is readily apparent that the present invention provides an improved and simplified stop for reciprocably coupled members, such as rotating cranes and the like, adapted effectively to dissipate rotational kinetic energy at determinable rates for achieving a "snubbing" and ultimate braking for the members without subjecting the structure to undue damage.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:
1. A stop for reciprocably coupled members of the type including a first and second structural member operatively interconnected and adapted to be driven for imparting reciprocating displacement therebetween, comprising:
    A. stop means;
    B. support means fixedly securing the stop means to the first structural member;
    C. a shock absorber operatively coupled with the second structural member; and
    D. means including a flexible cable having its first end portion operatively coupled with the shock absorber and having its second end portion extended to the first structural member to engage said stop means to be arrested thereby, whereby the cable is tensioned and caused to act against said shock absorber as displacement is imparted to the coupled member and the second end portion of the cable is arrested by the stop means.

2. The stop of claim 1 further comprising a gas-charged hydraulic-pneumatic accumulator operatively connected with the shock absorber.

3. The stop according to claim 2 wherein displacement of the coupled members is achieved in rotation and the support means includes an annular member disposed in concentric relationship with the path of displacement circumscribing a portion of the first structural member.

4. The stop according to claim 3 wherein the stop means includes:
    A. means defining mutually spaced bifurcated stop members; and
    B. pin means releasably securing each of the stop members to the annular member.

5. The stop of claim 4 wherein the shock absorber further includes:
    A. a single-acting hydraulic actuator including:
        1. a barrel including means defining a restricted opening; and
        2. a concentrically arranged reciprocating piston having a piston head seated within the barrel and defining a fluid chamber therewithin adjacent said opening adapted to be displaced outwardly in response to an introduction of fluid under predetermined pressure into said chamber through said opening and to act against the fluid to displace the same from the chamber through the opening when an inwardly directed force of a predetermined magnitude is applied to the piston head, and a piston shaft connected with the head and extended from the barrel adapted to be displaced inwardly and apply an inwardly directed force to said piston head;
    B. a first cable sheave coupled to an extended end portion of said shaft receiving said cable about the periphery thereof adapted to be displaced with the shaft;
    C. guide means receiving said first sheave therein and adapted to accommodate a reciprocating displacement thereof;
    D. means including a second cable sheave receiving and supporting said cable and being so disposed relative to the first cable sheave as to cause said cable to apply an inwardly directed force to said shaft when the cable is tensioned as the end portion thereof engages a stop member, whereby the piston shaft is caused to be displaced inwardly of said barrel and the piston head is caused to act against and to displace fluid from said chamber and into said accumulator as the cable is tensioned; and
    E. a restricted fluid conduit extending between said actuator and said accumulator communicating with said chamber through said opening, whereby the gas-charged accumulator operatively is caused to force fluid into said chamber under predetermined pressure, for extending the piston shaft therefrom, and to receive fluid forced from the chamber as the piston shaft is displaced inwardly of said barrel.

6. The stop of claim 5 further including:
    A. means defining a protuberance at the second end portion of the cable adapted alternately to engage the bifurcated stop members of the stop means; and
    B. guide means operatively aligned with said second cable sheave including a plurality of operatively associated cable sheaves, each sheave being adapted to receive said cable thereabout, whereby as the second member is rotated relative to the first, the protuberance alternately is caused to seat within the bifurcated members, whereupon the cable is displaced relative to peripheral surfaces of each of the sheaves as resulting tension is applied thereto.

7. The stop of claim 6 further comprising means fixed to said second structural member adapted to engage said cable adjacent the protuberance and transport the cable and protuberance from one stop member to the other and seat the protuberance therewithin.

8. The stop of claim 7 wherein the transport means includes:
    A. an arm fixed to said second member and extending laterally to a point located above said annular ring; and
    B. an extractor depending from said arm adapted to engage a selected portion of the cable as the arm is rotatingly displaced relative to said bifurcated stop member.

9. A stop for reciprocably coupled members particularly adapted to be associated with cranes of the type including a supporting base structure secured against rotation, reciprocably driven rotatable structure, and an extended boom supported by the rotatable structure and adapted to be reciprocably displaced as the rotatable structure is reciprocably displaced, comprising:
    A. a shock absorber mounted on the rotatable structure;

B. a plurality of cable sheaves mounted on the rotatable structure and operatively associated with said shock absorber;

C. a cable mounted on said sheaves and operatively connected with the shock absorber in a manner such that the cable is caused to act against the shock absorber when cable tensioning forces are applied to the cable having an end portion thereof fixed to said rotatable structure and an end portion extended in a lateral disposition relative to said rotatable structure;

D. an annular support circumscribing a portion of the base structure;

E. a pair of mutually spaced bifurcated stop members seated on said ring; and

F. means fixed to the extended end portion of said cable adapted to be fixedly seated within the bifurcated stop members as the rotatable structure is reciprocated, whereby the extended end of the cable is arrested and tensioning forces are thereby applied to said cable by said stop member for thus causing the cable to act against the shock absorber.

10. The stop of claim 9 wherein the shock absorber includes:

A. an hydraulic actuator having a reciprocating output shaft operatively connected with at least one cable sheave of the plurality of sheaves in a manner such as to apply a cable-tensioning force to the cable when the block is seated within a stop member; and B. a gas-charged hydraulic accumulator operatively coupled with the actuator to provide hydraulic fluid under pressure to the actuator for continuously urging the output shaft of the actuator in a cable-tensioning direction.